United States Patent
Riddick

(10) Patent No.: US 8,122,448 B2
(45) Date of Patent: Feb. 21, 2012

(54) ESTIMATION METHOD AND SYSTEM

(75) Inventor: Donald Morford Riddick, Ashville, AL (US)

(73) Assignee: International Business Machines Corporation, Armonk, NY (US)

( * ) Notice: Subject to any disclaimer, the term of this patent is extended or adjusted under 35 U.S.C. 154(b) by 1271 days.

(21) Appl. No.: 11/771,024

(22) Filed: Jun. 29, 2007

(65) Prior Publication Data

US 2009/0007114 A1 Jan. 1, 2009

(51) Int. Cl.
*G06F 9/46* (2006.01)
(52) U.S. Cl. .................... 718/100; 718/102
(58) Field of Classification Search .......... None
See application file for complete search history.

(56) References Cited

U.S. PATENT DOCUMENTS

| | | | |
|---|---|---|---|
| 6,502,205 B1 | 12/2002 | Yanai et al. | |
| 2003/0151837 A1 | 8/2003 | Smith et al. | |
| 2004/0260668 A1* | 12/2004 | Bradford | 707/1 |
| 2005/0180340 A1 | 8/2005 | Lee | |
| 2007/0064914 A1* | 3/2007 | Seyer et al. | 379/265.06 |

* cited by examiner

*Primary Examiner* — Kenneth Tang
(74) *Attorney, Agent, or Firm* — Schmeiser, Olsen & Watts; William Schiesser

(57) ABSTRACT

A time estimation method and system. The method comprises performing a loop of one or more iterations. Each iteration is for calculating a remaining time duration (RD) for completing a process for performing tasks. The loop is performed until the RD equals zero. Each iteration comprises receiving first data related to a plurality of objects associated with the process. A time to complete each object of the plurality of objects (POT) is calculated based on the first data. A number of objects of the plurality of objects remaining in the process (OR) is calculated based on the first data. Second data related to a plurality of work units is received. The plurality of work units is comprised by the plurality of objects. Each work unit is associated with a different task of the tasks. The RD is calculated based on the POT, the OR, and the second data.

24 Claims, 3 Drawing Sheets

ESTIMATION METHOD AND SYSTEM

FIELD OF THE INVENTION

The present invention relates to a method and associated system for estimating an amount of time remaining in a process.

BACKGROUND OF THE INVENTION

Determining recovery times for performing functions typically requires a series of steps that may be complicated and inaccurate. Inaccurate recovery times may lead to delays, testing malfunctions, higher costs, and low customer satisfaction. Typically, determining recovery times for performing functions is only based on one factor. Accordingly, there exists a need in the art to overcome the deficiencies and limitations described herein above.

SUMMARY OF THE INVENTION

The present invention provides a time estimation method comprising performing a loop of one or more iterations, each iteration of said one or more iterations for calculating a remaining time duration (RD) for completing a process comprising performing tasks, said loop performed until said RD equals zero, each said iteration comprising:

receiving, by a computing system, first data related to a plurality of objects associated with said process;

first calculating, by said computing system, a time to complete each object of said plurality of objects (POT), said first calculating based on said first data;

second calculating, by said computing system, a number of objects of said plurality of objects remaining in said process (OR), said second calculating based on said first data;

receiving, by said computing system, second data related to a plurality of work units, said plurality of work units comprised by said plurality of objects, each work unit of said plurality of work units associated with a different task of said tasks; and third calculating, by said computing system, said remaining time duration (RD) for completing said process, said third calculating based on said POT, said OR, and said second data.

The present invention provides a computing system comprising a processor coupled to a computer-readable memory unit, said memory unit instructions that when executed by the processor implement a time estimation method comprising performing a loop of one or more iterations, each iteration of said one or more iterations for calculating a remaining time duration (RD) for completing a process comprising performing tasks, said loop performed until said RD equals zero, each said iteration comprising:

receiving, by a computing system, first data related to a plurality of objects associated with said process;

first calculating, by said computing system, a time to complete each object of said plurality of objects (POT), said first calculating based on said first data;

second calculating, by said computing system, a number of objects of said plurality of objects remaining in said process (OR), said second calculating based on said first data;

receiving, by said computing system, second data related to a plurality of work units, said plurality of work units comprised by said plurality of objects, each work unit of said plurality of work units associated with a different task of said tasks; and third calculating, by said computing system, said remaining time duration (RD) for completing said process, said third calculating based on said POT, said OR, and said second data.

The present invention provides a computer program product, comprising a computer usable medium comprising a computer readable program code embodied therein, said computer readable program code adapted to implement a time estimation method comprising performing a loop of one or more iterations, each iteration of said one or more iterations for calculating a remaining time duration (RD) for completing a process comprising performing tasks, said loop performed until said RD equals zero, each said iteration comprising:

receiving, by a computing system, first data related to a plurality of objects associated with said process;

first calculating, by said computing system, a time to complete each object of said plurality of objects (POT), said first calculating based on said first data;

second calculating, by said computing system, a number of objects of said plurality of objects remaining in said process (OR), said second calculating based on said first data;

receiving, by said computing system, second data related to a plurality of work units, said plurality of work units comprised by said plurality of objects, each work unit of said plurality of work units associated with a different task of said tasks; and third calculating, by said computing system, said remaining time duration (RD) for completing said process, said third calculating based on said POT, said OR, and said second data.

The present invention provides a process for integrating computing infrastructure, comprising integrating computer-readable code into a computing system, wherein the code in combination with the computing system is capable of performing a time estimation method comprising performing a loop of one or more iterations, each iteration of said one or more iterations for calculating a remaining time duration (RD) for completing a process comprising performing tasks, said loop performed until said RD equals zero, each said iteration comprising:

receiving, by a computing system, first data related to a plurality of objects associated with said process;

first calculating, by said computing system, a time to complete each object of said plurality of objects (POT), said first calculating based on said first data;

second calculating, by said computing system, a number of objects of said plurality of objects remaining in said process (OR), said second calculating based on said first data;

receiving, by said computing system, second data related to a plurality of work units, said plurality of work units comprised by said plurality of objects, each work unit of said plurality of work units associated with a different task of said tasks; and third calculating, by said computing system, said remaining time duration (RD) for completing said process, said third calculating based on said POT, said OR, and said second data.

The present invention advantageously provides a simple method and associated system capable of determining recovery times for performing functions.

DETAILED DESCRIPTION OF THE INVENTION

Figure 1:
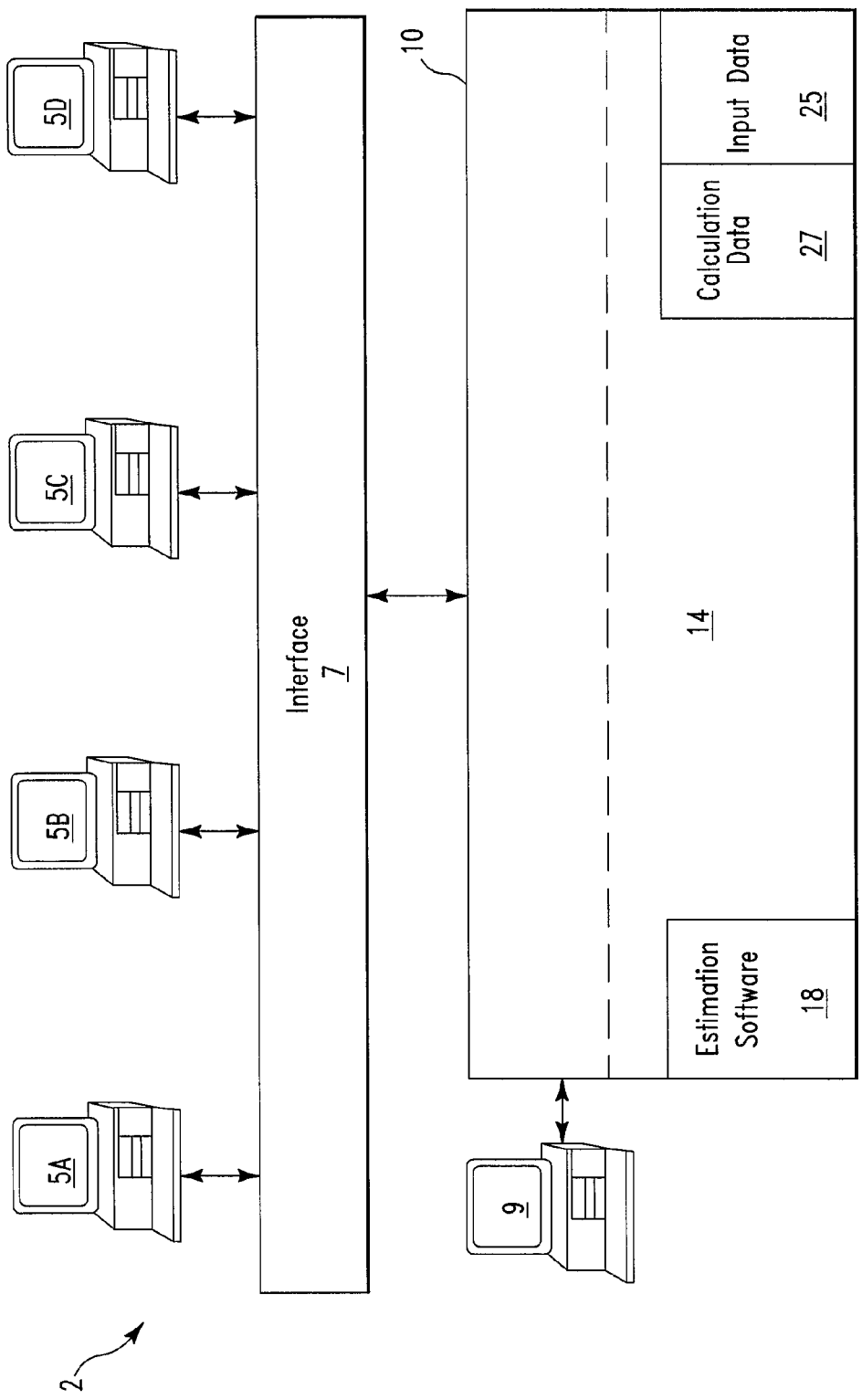
FIG. 1 illustrates a block diagram of a system 2 for periodically estimating a remaining time duration for completing a process as the process is performed, in accordance with embodiments of the present invention.

FIG. 1 illustrates a block diagram of a system 2 for periodically (i.e., performing a loop) estimating a remaining time duration (RD) for completing a process as the process is performed, in accordance with embodiments of the present invention. The RD is continuously estimated (i.e., calculated) until the RD is equal to zero (i.e., the process is completed). System 2 may be used to periodically estimate a remaining time duration (RD) for completing any process known to a person of ordinary skill in the art including, inter alia, a software installation process, a software recovery process, a hardware installation process, a manufacturing production process, a distribution process, a construction process, a human services process, etc. System 2 executes estimation software 18 that comprises an algorithm for periodically performing an adaptive time estimation process (i.e., for estimating a remaining time duration (RD) for completing a process) that takes into account plurality of factors. For example, in a data recovery process, system 2 periodically estimates a time for completion taking into account data size, recovery hardware transaction times, objects (e.g., files) to be recovered, and a recovery history. The plurality of factors used to determine a remaining time duration (RD) for completing a process includes factors related to:
1. Work (i.e., in work units) performed in the task or process.
2. Objects comprising the work.
3. A time duration for completing:
   A. Each work unit of the work
   B. Each object comprising the work.
   C. Transactions between each work unit.

Work is defined herein as an amount of effort which must be performed to complete a task. Work is the summation of work units (e.g., activities) required to complete a task or process. For example, work may include, inter alia, a number of bits of data in a file, a number of nails that must be nailed into a board, a number of pages necessary to complete a book, etc. Work may refer to any elements (i.e., work units) that may be measured, including temporal and size measurements. An example of a temporal element would be "timing" each runner in a race. The measurement of the time to complete the race for each runner would be work.

An object is defined herein as any container or portion of a container, framework, or element upon which work is performed. An object may comprise one or more units of work that must be performed upon the object. For example, an object may comprise a house. The house comprises walls, electrical systems, plumbing, flooring, roofing and other activities that are defined as work units to be performed. In a data restoration process, a file is considered to be an object. The file comprises a number of bits of data. The bits of data are defined as the work.

Duration is defined herein as an amount of time that a work unit takes to complete or an amount of time that a transaction between work units takes to complete. For example, an amount of time that a work unit takes to complete may comprise a time to read each page in a chapter (i.e., in a book) and amount of time that a transaction between work units takes to complete may comprise a time to turn an extra page in between chapters (i.e., in a book).

System 2 of FIG. 1 comprises a plurality of terminals 5A . . . 5D connected to a computing apparatus 10 through an interface 7. Interface 7 may comprise any type of interface known to a person of ordinary skill in the art including, inter alia, a local area network, (LAN), a wide area network (WAN), the Internet, etc. Additionally, system 2 comprises an input terminal 9. System 2 may be used to calculate a remaining time duration (RD) for completing processes within any of terminals 5A . . . 5D or within computing apparatus 10. Alternatively, system 2 may be used to calculate a remaining time duration (RD) for completing processes external to system 2. Computing apparatus 10 may comprise any type of computing apparatus including, inter alia, a personal computer (PC), a server computer, etc. Computing apparatus 10 comprises a memory apparatus 14. Memory apparatus 14 comprises estimation software 18, calculation data 27, and input data 35. Input data 25 comprises data related to:
1. Work (i.e., in work units) performed in the process.
2. Objects comprising the work.
3. A time duration for completing:
   A. Each work unit of the work
   B. Each object comprising the work.
   C. Transactions between each work unit.

If system 2 is used to calculate a remaining time duration (RD) for completing processes within any of terminals 5A . . . 5D or within computing apparatus 10, then input data 25 is generated by any of terminals 5A . . . 5D or computing apparatus 10. If system 2 is used to calculate a remaining time duration (RD) for completing processes external to system 2 then input data may be inputted into memory apparatus 14 using input terminal 9. Calculation data 27 comprises any functions or subprograms for implementing equations (e.g., see equation 1 and 2, infra) that are used to calculate a remaining time duration (RD) for completing a process. Estimation software 18 comprises any algorithms (e.g., see algorithm in FIG. 2) used to calculate a remaining time duration (RD) for completing a process. The calculated remaining time durations (RD) may be stored within memory device 14 and/or displayed on any of terminals 5A . . . 5D.

Equation 1 listed below is used by system 2 of FIG. 1 to periodically estimate a remaining time duration (RD) for completing a process until the process is completed. Equation 1 uses data related to work units, objects, and time durations (i.e., to complete each work unit in the process) to periodically an estimate a remaining time duration (RD) for completing a process. Equation 1 is illustrated below:

$$RD=(POT*OR)*(OC\%/WC\%) \quad (1)$$

The following list 1 defines all of the elements of Equation 1:

List 1

RD=Remaining time duration in the process.
POT=Per Object Time=D/OC (or alternatively D-TD/OC)–
   An amount of time to complete each object in the process.
D=Time duration to complete each work unit in the process.
OC=Objects completed in the process. OC must be at least one.
TD=Time duration to complete each transaction between work units in the process.
OR=Objects remaining in the process=OT−OC
OT=Total objects in the process.
OC %=Percentage of objects completed in the process=OC/OT
WC %=Percentage of work unit completed in the process=WC/WT WC=Work unit completed in the process. WC must be at least one.
WT=Total work unit in the process.

Equation 2 listed below is an alternative equation to Equation 1. Equation 2 is used by system 2 of FIG. 1 to periodically estimate a remaining time duration (RD) for completing a process. Equation 2 uses data related to work units, objects, time durations to complete each work unit in the process, and time durations to complete transactions between each work unit in the process to periodically an estimate a remaining time duration (RD) for completing a process. Equation 2 is illustrated below:

$$RD=(POT*OR)*(OC\%/WC\%)+TE*OR \quad (2)$$

The following list 2 defines all the additional elements of equation 2 (i.e., elements that are not comprised list 1):
List 2
TE=Transaction time estimate=TD/OC.

Input data 25 may comprise any of D, OC, TD, OT, WC, and WT. Calculation data 27 may comprise any functions or subprograms for implementing Equation 1 and/or 2.

The following steps illustrate a case where multiple remaining durations (RD) are simultaneously calculated for multiple processes (i.e., for parallel processing).
1. Computing apparatus 14 stores all RD calculations (i.e., calculated using equation 1 or 2) for parallel processes.
2. Computing apparatus 14 identifies which RD is the greatest RD (e.g., an RD of 30 days is greater than an RD of 25 days)
3. Computing apparatus 14 displays (on one of terminals 5A . . . 5D) the greatest RD.
4. Computing apparatus 14 optionally displays (on one of terminals 5A . . . 5D) each RD from least to greatest.
5. Computing apparatus 14 calculates and displays (on one of terminals 5A . . . 5D) an average RD for all of the calculated RDs. The average RD is calculated by the following equation 3:

$$H1+H_N/N \quad (3)$$

H1 is a first calculated RD. $H_N$ is an Nth calculated RD. N is a total number of RDs.

Examples 1 and 2 described below illustrate examples of implementation using system 2 for periodically estimating a remaining time duration (RD) for completing a writing and mailing letters process as the process is performed.

EXAMPLE 1

User A has 100 pages of stationary (work units) upon which to write letters to 10 of his/her closest friends. User decides to use all 100 pages and all 10 of his/her envelopes (objects). User A records the times and data for all of his/her activities. User A writes 10 pages for a first letter. This takes 30 minutes. User A then folds the 10 pages, places them in the envelope, addresses the envelope, and stamps the envelope. This transaction takes 10 minutes. The total time to write 10 pages, fold the 10 pages, place them in the envelope, addresses the envelope, and stamp the envelope is 40 minutes (i.e., 30+10). Next user A composes another letter comprising 2 pages (i.e., taking 2 minutes) and takes 8 minutes to place the next letter in the envelope, address the envelope, and stamp the envelope. User A has now spent 50 total minutes and completed 2 letters with 12 pages. The following List 3 illustrates input data 25 that user A inputs into computing apparatus 10.

List 3
D=50 min
OC=2
WC=12
TD=10+8=18 min
WT=100
OT=10

Computing apparatus 10 uses input data 25 of list 3 and any functions or subprograms for implementing Equation 2 to estimate a time for completing (RD) the writing and mailing letters process of example 1 as follows:

$$POT=(D-TD)/OC=(50-18/2)=16$$

$$OR=OT-OC=10-2=8$$

$$OC\%=OC/OT=2/10=0.2$$

$$WC\%=WC/WT=12/100=0.12$$

$$TE=TD/OC=18/2=9$$

$$RD=(POT*OR)*(OC\%/WC\%)+TE*OR$$

$$RD=(16*8)*(0.2/0.12)+9*8=276.8$$

Therefore in example A, computing apparatus 10 calculates that user A will complete the writing and mailing letters process in 276.8 minutes. The RD is periodically recalculated until the process is completed (i.e., RD=0).

EXAMPLE 2

User A has 100 pages of stationary (work units) upon which to write letters to 10 of his/her closest friends. User decides to use all 100 pages and all 10 of his/her envelopes (objects). User A records the times and data for all of his/her activities. User A has completed 50 pages for 5 letters in 80 minutes and used 20 minutes for a first set of transactions (i.e., to fold the 50 pages, place them in the envelopes, addresses the envelopes, and stamp the envelopes). Additionally, user A had to repair a stapler, which took an additional 20 minutes in transaction time (a second set of transactions). Therefore, user A has completed 5 letters in 120 minutes (i.e., 80+20+20). The following list 4 illustrates input data 25 that user A inputs into computing apparatus 10.
List 4
D=120 min
OC=5
WC=50
TD=20+20=40 min
WT=100
OT=10

Computing apparatus 10 uses input data 25 of list 4 and equation 2 to estimate a time for completing (RD) the writing and mailing letters process of example 2 as follows:

$$POT=(D-TD)/OC=(120-40/5)=16$$

$$OR=OT-OC=10-5=5$$

$$OC\%=OC/OT=5/10=0.5$$

$$WC\%=WC/WT=50/100=0.5$$

$$TE=TD/OC=40/5=8$$

$$RD=(POT*OR)*(OC\%/WC\%)+TE*OR$$

$$RD=(16*5)*(0.5/0.5)+8*5=130$$

Therefore in example 2, computing apparatus 10 calculates that user A will complete the writing and mailing letters process including the stapler repair in 130 minutes. The RD is periodically recalculated until the process is completed (i.e., RD=0).

Figure 2:
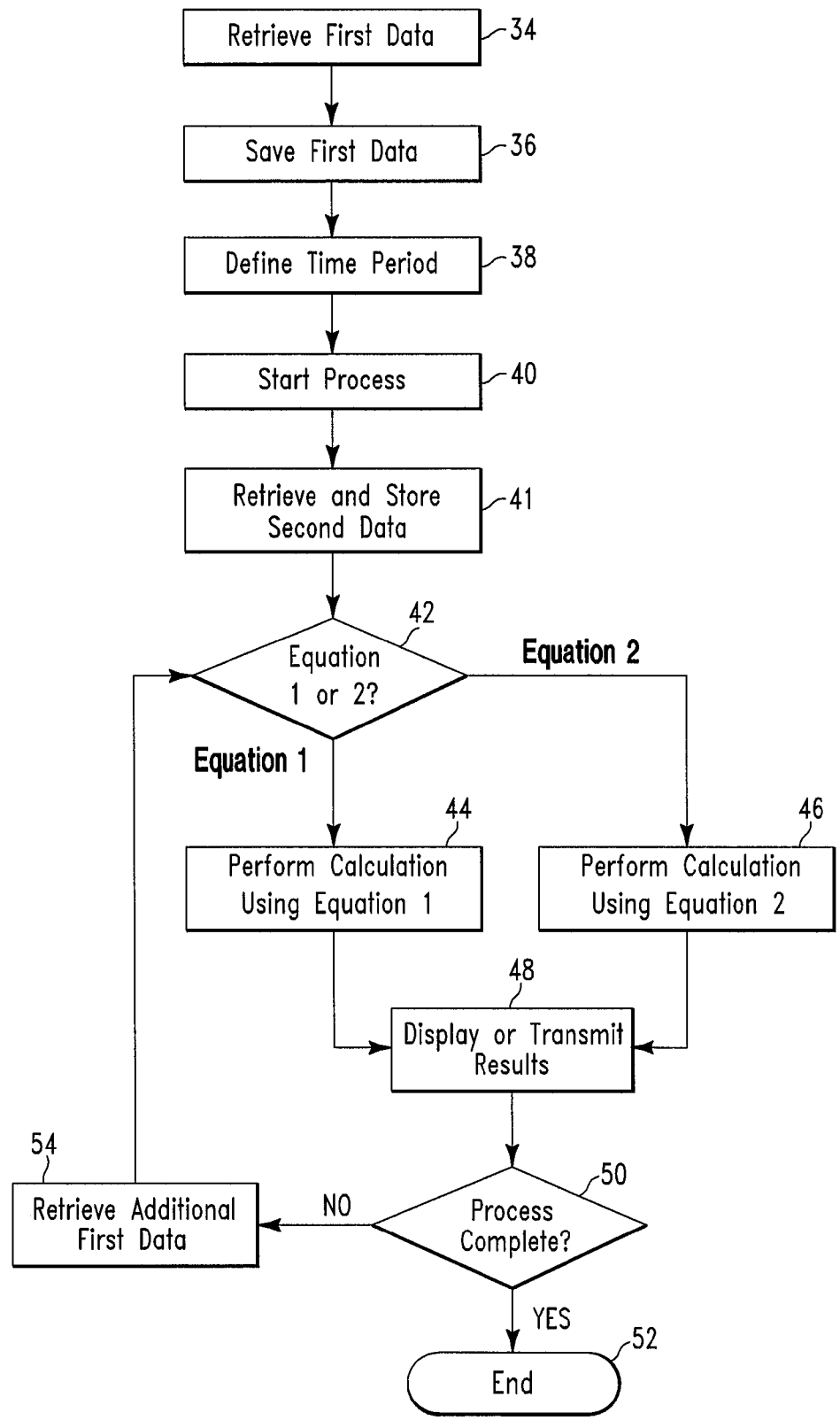
FIG. 2 illustrates a flowchart describing an algorithm used by system 2 of FIG. 1, in accordance with embodiments of the present invention.

FIG. 2 illustrates a flowchart describing an algorithm used by system 2 of FIG. 1 for periodically estimating a remaining time duration (RD) for completing a process as the process is performed, in accordance with embodiments of the present invention. In step 34, first data related to a process is retrieved. The first data comprises a time duration to complete each work unit (D) in the process, a time duration (TD) to complete each transaction between work units in the process, a number of objects completed in the process (OC), and a total number of objects in the process (OT). In step 36, the first data is stored in memory apparatus 14. In step 38, a time period for periodically calculating a remaining time duration (RD) for completing the process is defined and programmed into estimation software 18 of FIG. 1. For example, a user may want to calculate a remaining time duration (RD) every 2 minutes (i.e., the time period defined) until the process is completed. In step 40, the process is initiated. In step 41, second data related to the process is retrieved and stored. The second data comprises a total number of work units in the process (WT) and a number of work unit completed so far in the process (WC). In step 42, it is determined if equation 1 (does not take into account any transactional time) or equation 2 (takes into account any transactional time) will be used to calculate a remaining time duration (RD) for the process (i.e., process that the RD is being calculated for).

If in step 42 it is determined that equation 1 will be used to calculate a remaining time duration (RD) for the process, then in step 44 the first data and the second data is inputted into equation 1 (i.e., RD=(POT*OR)*(OC %/WC %)) and a remaining time duration (RD) for the process is calculated. In step 48, the results (i.e., RD) are displayed for the user or transmitted to the user. In step 50 it is determined if the process (i.e., process that the RD is being calculated for) is complete. If in step 50 it is determined that the process (i.e., process that the RD is being calculated for) is not complete then in step 54 additional first data is retrieved and step 41 is repeated so that another RD for the process may be calculated. If in step 50 it is determined that the process (i.e., process that the RD is being calculated for) is complete then in step 52 the algorithm is terminated.

If in step 42 it is determined that equation 2 will be used to calculate a remaining time duration (RD) for the process, then in step 46 the first data and the second data is inputted into formula 2 (i.e., RD=(POT*OR)*(OC %/WC %)+TE*OR) and a remaining time duration (RD) for the process is calculated. In step 48, the results (i.e., RD) are displayed for the user or transmitted to the user. In step 50 it is determined if the process (i.e., process that the RD is being calculated for) is complete. If in step 50 it is determined that the process (i.e., process that the RD is being calculated for) is not complete then in step 54 additional first data is retrieved and step 41 is repeated so that another RD for the process may be calculated. If in step 50 it is determined that the process (i.e., process that the RD is being calculated for) is complete then in step 52 the algorithm is terminated.

Figure 3:
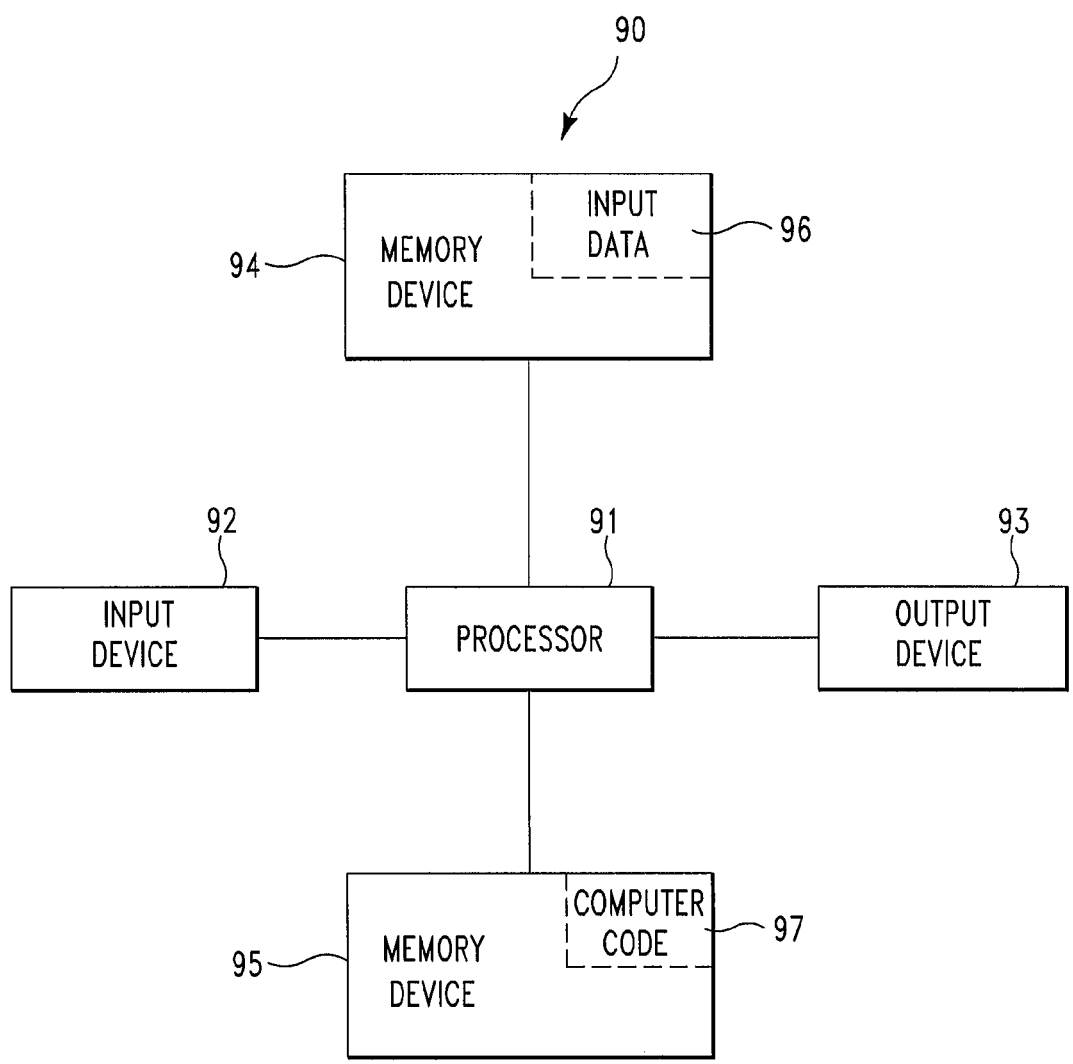
FIG. 3 illustrates a computer apparatus used for periodically estimating a remaining time duration for completing a process as the process is performed, in accordance with embodiments of the present invention.

FIG. 3 illustrates a computer apparatus 90 (i.e., computing apparatus 10 in FIG. 1) used for periodically estimating a remaining time duration (RD) for completing a process as the process is performed, in accordance with embodiments of the present invention. The computer system 90 comprises a processor 91, an input device 92 coupled to the processor 91, an output device 93 coupled to the processor 91, and memory devices 94 and 95 each coupled to the processor 91. The input device 92 may be, inter alia, a keyboard, a mouse, etc. The output device 93 may be, inter alia, a printer, a plotter, a computer screen, a magnetic tape, a removable hard disk, a floppy disk, etc. The memory devices 94 and 95 may be, inter alia, a hard disk, a floppy disk, a magnetic tape, an optical storage such as a compact disc (CD) or a digital video disc (DVD), a dynamic random access memory (DRAM), a read-only memory (ROM), etc. The memory device 95 includes a computer code 97. The computer code 97 includes an algorithm (e.g., algorithm of FIG. 2) for periodically estimating a remaining time duration (RD) for completing a process as the process is performed. The processor 91 executes the computer code 97. The memory device 94 includes input data 96. The input data 96 includes input required by the computer code 97. The output device 93 displays output from the computer code 97. Either or both memory devices 94 and 95 (or one or more additional memory devices not shown in FIG. 3) may comprise the algorithm of FIG. 2 and may be used as a computer usable medium (or a computer readable medium or a program storage device) having a computer readable program code embodied therein and/or having other data stored therein, wherein the computer readable program code comprises the computer code 97. Generally, a computer program product (or, alternatively, an article of manufacture) of the computer system 90 may comprise said computer usable medium (or said program storage device).

Still yet, any of the components of the present invention could be deployed, managed, serviced, etc. by a service provider who offers to provide a periodic estimation for a remaining time duration (RD) for completing a process as the process is performed. Thus the present invention discloses a process for deploying or integrating computing infrastructure, comprising integrating computer-readable code into the computer system 90, wherein the code in combination with the computer system 90 is capable of performing a method periodically estimating a remaining time duration (RD) for completing a process as the process is performed. In another embodiment, the invention provides a business method that performs the process steps of the invention on a subscription, advertising, and/or fee basis. That is, a service provider, such as a Solution Integrator, could offer to periodically estimate a remaining time duration (RD) for completing a process as the process is performed. In this case, the service provider can create, maintain, support, etc., a computer infrastructure that performs the process steps of the invention for one or more customers. In return, the service provider can receive payment from the customer(s) under a subscription and/or fee agreement and/or the service provider can receive payment from the sale of advertising content to one or more third parties.

While FIG. 3 shows the computer system 90 as a particular configuration of hardware and software, any configuration of hardware and software, as would be known to a person of ordinary skill in the art, may be utilized for the purposes stated supra in conjunction with the particular computer system 90 of FIG. 3. For example, the memory devices 94 and 95 may be portions of a single memory device rather than separate memory devices.

While embodiments of the present invention have been described herein for purposes of illustration, many modifications and changes will become apparent to those skilled in the art. Accordingly, the appended claims are intended to encompass all such modifications and changes as fall within the true spirit and scope of this invention.

What is claimed is:

1. A time estimation method comprising performing a loop of one or more iterations, each iteration of said one or more iterations for calculating a remaining time duration (RD) for completing a process comprising performing tasks, said loop performed until said RD equals zero, each said iteration comprising:
receiving, by a computing system, first data related to a plurality of objects associated with said process;
first calculating, by said computing system, a time to complete each object of said plurality of objects (POT), said first calculating based on said first data;
second calculating, by said computing system, a number of objects of said plurality of objects remaining in said process (OR), said second calculating based on said first data;
receiving, by said computing system, second data related to a plurality of work units, said plurality of work units comprised by said plurality of objects, each work unit of said plurality of work units associated with a different task of said tasks, wherein said first data comprises a time duration to complete each said work unit (D), a number of objects of said plurality of objects completed in said process (OC), and a total number of objects in said process (OT), wherein POT=D/OC, and wherein OR=OT−OC, and wherein said second data comprises a number of work units of said plurality of work units completed in said process (WC) and a total number of work units in said process (WT); and
third calculating, by said computing system, said remaining time duration (RD) for completing said process, said third calculating based on said POT, said OR, and said second data, wherein said third calculating comprises calculating a percentage of objects completed in said process (OC %) and a percentage of work completed in said process (WC %), wherein said OC is at least 1, wherein WC is at least 1, wherein OC %=OC/OT, wherein WC %=WC/WT, and wherein RD=(POT*OR)*(OC %/WC %).

2. The method of claim 1, wherein said second data further comprises a time duration for completing transactions between each of said work units (TD), wherein said third calculating further comprises calculating a transaction estimate of remaining transaction times (TE), wherein TE=TD/OC, and wherein RD=(POT*OR)*(OC %/WC %)+TE*OR.

3. The method of claim 1, further comprising:
receiving, by said computing system, a specified time period, wherein said third calculating comprises calculating RD at time intervals specified by said specified time period.

4. The method of claim 1, further comprising:
storing, by said computing system, each calculated RD for each said iteration.

5. The method of claim 1, further comprising:
displaying, by said computing system, each calculated RD for each said iteration.

6. The method of claim 1, wherein said process is selected from the group consisting of a software installation process, a software recovery process, a hardware installation process, a manufacturing production process, a distribution process, a construction process, and a human services process.

7. A computing system comprising a processor coupled to a computer-readable memory unit, said memory unit instructions that when executed by the processor implement a time estimation method comprising performing a loop of one or more iterations, each iteration of said one or more iterations for calculating a remaining time duration (RD) for completing a process comprising performing tasks, said loop performed until said RD equals zero, each said iteration comprising:
receiving, by a computing system, first data related to a plurality of objects associated with said process;
first calculating, by said computing system, a time to complete each object of said plurality of objects (POT), said first calculating based on said first data;
second calculating, by said computing system, a number of objects of said plurality of objects remaining in said process (OR), said second calculating based on said first data;
receiving, by said computing system, second data related to a plurality of work units, said plurality of work units comprised by said plurality of objects, each work unit of said plurality of work units associated with a different task of said tasks, wherein said first data comprises a time duration to complete each said work unit (D), a number of objects of said plurality of objects completed in said process (OC), and a total number of objects in said process (OT), wherein POT=D/OC, and wherein OR=OT−OC, and wherein said second data comprises a number of work units of said plurality of work units completed in said process (WC) and a total number of work units in said process (WT); and
third calculating, by said computing system, said remaining time duration (RD) for completing said process, said third calculating based on said POT, said OR, and said second data, wherein said third calculating comprises calculating a percentage of objects completed in said process (OC %) and a percentage of work completed in said process (WC %), wherein said OC is at least 1, wherein WC is at least 1, wherein OC %=OC/OT, wherein WC %=WC/WT, and wherein RD=(POT*OR)*(OC %/WC %).

8. The computing system of claim 7, wherein said second data further comprises a time duration for completing transactions between each of said work units (TD), wherein said third calculating further comprises calculating a transaction estimate of remaining transaction times (TE), wherein TE=TD/OC, and wherein RD=(POT*OR)*(OC %/WC %)+TE*OR.

9. The computing system of claim 7, wherein each said iteration further comprises:
receiving, by said computing system, a specified time period, wherein said third calculating comprises calculating RD at time intervals specified by said specified time period.

10. The computing system of claim 7, wherein each said iteration further comprises:
storing, by said computing system, each calculated RD for each said iteration.

11. The computing system of claim 7, wherein each said iteration further comprises:
displaying, by said computing system, each calculated RD for each said iteration.

12. The computing system of claim 7, wherein said process is selected from the group consisting of a software installation process, a software recovery process, a hardware installation process, a manufacturing production process, a distribution process, a construction process, and a human services process.

13. A computer program product, comprising a computer readable storage device storing a computer readable program code, said computer readable program code adapted to implement a time estimation method comprising performing a loop of one or more iterations, each iteration of said one or more iterations for calculating a remaining time duration (RD) for completing a process comprising performing tasks, said loop performed until said RD equals zero, each said iteration comprising:
- receiving, by a computing system, first data related to a plurality of objects associated with said process;
- first calculating, by said computing system, a time to complete each object of said plurality of objects (POT), said first calculating based on said first data;
- second calculating, by said computing system, a number of objects of said plurality of objects remaining in said process (OR), said second calculating based on said first data;
- receiving, by said computing system, second data related to a plurality of work units, said plurality of work units comprised by said plurality of objects, each work unit of said plurality of work units associated with a different task of said tasks, wherein said first data comprises a time duration to complete each said work unit (D), a number of objects of said plurality of objects completed in said process (OC), and a total number of objects in said process (OT), wherein POT=D/OC, and wherein OR=OT−OC, and wherein said second data comprises a number of work units of said plurality of work units completed in said process (WC) and a total number of work units in said process (WT); and
- third calculating, by said computing system, said remaining time duration (RD) for completing said process, said third calculating based on said POT, said OR, and said second data, wherein said third calculating comprises calculating a percentage of objects completed in said process (OC %) and a percentage of work completed in said process (WC %), wherein said OC is at least 1, wherein WC is at least 1, wherein OC %=OC/OT, wherein WC %=WC/WT, and wherein RD=(POT*OR)*(OC %/WC %).

14. The computer program product of claim 13, wherein said second data further comprises a time duration for completing transactions between each of said work units (TD), wherein said third calculating further comprises calculating a transaction estimate of remaining transaction times (TE), wherein TE=TD/OC, and wherein RD=(POT*OR)*(OC %/WC %)+TE*OR.

15. The computer program product of claim 13, wherein each said iteration further comprises:
- receiving, by said computing system, a specified time period, wherein said third calculating comprises calculating RD at time intervals specified by said specified time period.

16. The computer program product of claim 13, wherein each said iteration further comprises:
- storing, by said computing system, each calculated RD for each said iteration.

17. The computer program product of claim 13, wherein each said iteration further comprises:
- displaying, by said computing system, each calculated RD for each said iteration.

18. The computer program product of claim 13, wherein said process is selected from the group consisting of a software installation process, a software recovery process, a hardware installation process, a manufacturing production process, a distribution process, a construction process, and a human services process.

19. A process for integrating computing infrastructure, comprising integrating computer-readable code into a computing system, wherein the code in combination with the computing system is capable of performing a time estimation method comprising performing a loop of one or more iterations, each iteration of said one or more iterations for calculating a remaining time duration (RD) for completing a process comprising performing tasks, said loop performed until said RD equals zero, each said iteration comprising:
- receiving, by a computing system, first data related to a plurality of objects associated with said process;
- first calculating, by said computing system, a time to complete each object of said plurality of objects (POT), said first calculating based on said first data;
- second calculating, by said computing system, a number of objects of said plurality of objects remaining in said process (OR), said second calculating based on said first data;
- receiving, by said computing system, second data related to a plurality of work units, said plurality of work units comprised by said plurality of objects, each work unit of said plurality of work units associated with a different task of said tasks, wherein said first data comprises a time duration to complete each said work unit (D), a number of objects of said plurality of objects completed in said process (OC), and a total number of objects in said process (OT), wherein POT=D/OC, and wherein OR=OT−OC, and wherein said second data comprises a number of work units of said plurality of work units completed in said process (WC) and a total number of work units in said process (WT); and
- third calculating, by said computing system, said remaining time duration (RD) for completing said process, said third calculating based on said POT, said OR, and said second data, wherein said third calculating comprises calculating a percentage of objects completed in said process (OC %) and a percentage of work completed in said process (WC %), wherein said OC is at least 1, wherein WC is at least 1, wherein OC %=OC/OT, wherein WC %=WC/WT, and wherein RD=(POT*OR)*(OC %/WC %).

20. The process of claim 19, wherein said second data further comprises a time duration for completing transactions between each of said work units (TD), wherein said third calculating further comprises calculating a transaction estimate of remaining transaction times (TE), wherein TE=TD/OC, and wherein RD=(POT*OR)*(OC %/WC %)+TE*OR.

21. The process of claim 19, wherein each said iteration further comprises:
- receiving, by said computing system, a specified time period, wherein said third calculating comprises calculating RD at time intervals specified by said specified time period.

22. The process of claim 19, wherein each said iteration further comprises:
- storing, by said computing system, each calculated RD for each said iteration.

23. The process of claim 19, wherein each said iteration further comprises:
- displaying, by said computing system, each calculated RD for each said iteration.

24. The process of claim 19, wherein said process is selected from the group consisting of a software installation process, a software recovery process, a hardware installation process, a manufacturing production process, a distribution process, a construction process, and a human services process.

* * * * *